United States Patent [19]

Miyagi et al.

[11] Patent Number: 4,722,792

[45] Date of Patent: Feb. 2, 1988

[54] FILTER FOR CENTRIFUGAL SEPARATOR

[75] Inventors: Tokuya Miyagi, Osaka; Shigeaki Matsui, Hirakata; Yoshiro Hirajima, Uji, all of Japan

[73] Assignee: Kurashiki Boseki Kabushiki Kaisha, Okayama, Japan

[21] Appl. No.: 825,927

[22] Filed: Feb. 4, 1986

[30] Foreign Application Priority Data

Feb. 9, 1985 [JP] Japan .............................. 60-017550[U]
Feb. 19, 1985 [JP] Japan .............................. 60-023354[U]
Jan. 29, 1986 [JP] Japan .................................. 61-19128

[51] Int. Cl.$^4$ ...................... B01D 33/00; B01D 35/02
[52] U.S. Cl. ................... 210/360.1; 210/380.1; 210/515; 210/518; 210/927; 210/DIG. 24; 422/61
[58] Field of Search ............... 210/927, DIG. 24, 541, 210/513, 542, 514, 360.1, 515, 518, 380.1; 435/296; 422/61; 436/810

[56] References Cited

U.S. PATENT DOCUMENTS

4,458,020 7/1984 Bohn et al. ........................ 210/927
4,522,713 6/1985 Nussbaumer et al. ............. 210/927

Primary Examiner—Frank Sever
Attorney, Agent, or Firm—Wenderoth, Lind & Ponack

[57] ABSTRACT

The disclosure relates to a filter in use for centrifugal separator including a filter film between a sample chamber and a filtrate chamber. The filter film is inclined or parallel to an axis of the filter. Accordingly, when the filter is utilized for either the angle rotor type and swing rotor type of centrifugal separators, the filter is positioned, during operation, so as to be inclined or parallel to the direction of the centrifugal force so that the residue contained in the liquid sample in the sample chamber moves radially outwardly with respect to the axis of the rotors so as to slide on the filter film or so as to leave from the filter film. Thus, the filter film will not easily result in clogging with the residue so that the high filtration speed can be maintained for a long period of time.

7 Claims, 19 Drawing Figures

FILTER FOR CENTRIFUGAL SEPARATOR

BACKGROUND OF THE INVENTION

1. Field of the Invention

The present invention generally relates to a filter for a centrifugal separator, and more particularly, to a filter for filtrating the example, a biological substance such as an antibody, enzyme, nucleic acid and protein, for the purpose of concentration, desalting, purification, fractionation, etc. thereof.

2. Description of the Prior Art

Conventionally, the filter of a type which is utilized in association with the centrifugal separator is well known. The centrifugal separator can be classified as two types, namely a so-called swing rotor type and a so-called angle rotor type. The swing rotor type of centrifugal separator has a rotor for pivotally suspending a plurality of filters therearound so that the filters can swing so as to become horizontal when the rotor rotates. Contrary to the above, the angle rotor type of centrifugal separator comprises a rotor having a plurality of bores for accommodating the filters. Each of the bores is formed such that the axis of each bore is inclined to the rotational axis of the rotor at a predetermined angle, for example 30° to 60°.

Meanwhile, the angle rotor type of centrifugal separator has advantages in that the filters can be fixedly accommodated in the bores formed in the rotor in a stable manner even if the rotor rotates at a very high speed, and the filtration speed is relatively high.

Figures 1, 2:
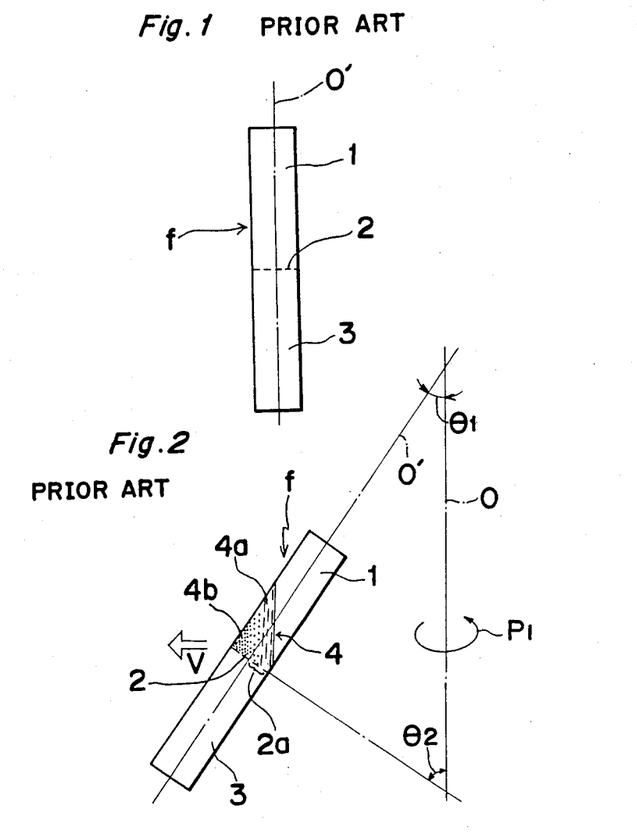
FIG. 1 is a diagrammatic view of a prior art filter for a centrifugal separator, as previously described.
FIGS. 2 and 3 are diagrammatic views respectively showing the conditions wherein the filter shown in FIG. 1 is utilized with an angle rotor type and a swing rotor type of centrifugal separators, as previously described.
Figure 3:
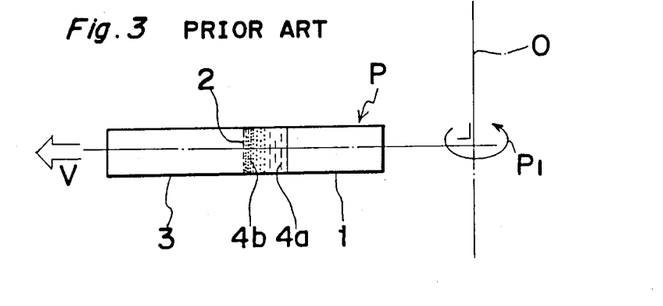

An example of the prior art filter f is shown in FIGS. 1 to 3. The filter f has a cylindrical configuration comprising a cylindrical sample container 1, into which a liquid sample is to be supplied, and a cylindrical filtrate container 3 which is coupled to the bottom portion of the sample container and in which the filtrate is reserved. A filter film 2 is positioned between the pair of containers 1 and 3 and is generally arranged on a bottom wall of the sample container 1. It is to be noted that, as apparent from the drawing, the filter film 2 is positioned at the right angle with respect to an axis O' of the cylindrical filter f.

FIG. 2 shows a case where the filter f as described above is utilized for the angle rotor type of centrifugal separator. The rotational axis of the rotor is indicated by a symbol "O". Each filter f is fixed in the corresponding bores of the rotor so that the axis O' of each filter f is inclined at an angle $\theta1$ with respect to the axis O. When the rotor rotates in a direction indicated by an arrow P1 in FIG. 2, a centrifugal force in a direction indicated by an arrow V is generated. Meanwhile, since the axis O' of the filter f is inclined to the axis O of the rotor at the angle $\theta1$, the filter film 2 is inclined to the axis O at an angle $\theta2$, provided that $\theta2 = 90° - \theta1$. Accordingly, the residue or solute 4b contained in the liquid sample 4 gradually moves to the left as viewed in FIG. 2, due to the centrifugal force according to the proceeding of the operation to separate from the solvent 4a. In this case, although the residue 4b is depressed onto the filter film 2, the residue 4b is able to slide on the filter film 2 in the direction V of the centrifugal force since the filter film 2 is inclined to the axis O at the angle $\theta2$. That is to say, some part 2a of the filter film 2 near to the axis O is free from the covering of the residue 4b even if the centrifugal separation has sufficiently proceeded. Thus, the part 2a of the filter film 2 is prevented from being clogged with the residue 4b, so that the solvent 4a is able to readily pass through the part 2a of the filter film 2 from the sample chamber of the sample container into the filtrate chamber of the filtrate container 3. It will be apparent from the foregoing description that, according to the angle rotor type of the centrifugal separator, the high filtration speed of the filter film 2 can be maintained for a long period of time.

When the filter f is utilized with the swing rotor type of centrifugal separator, the filtration speed of the filter film 2 decreases rapidly according to operation. FIG. 3 shows a case where the filter f is adapted to the swing rotor type of centrifugal separator. As shown in FIG. 3, the residue 4b gradually moves in the direction V of the centrifugal force according to the operation. In this case, the filter 2 is positioned parallel to the axis O of the rotor during the operation. Accordingly, the residue 4b rapidly covers the entire filter film 2. When the layer of the residue become relatively thick, the entire filter film 2 is clogged with the residue 4b so that the filtration speed of the filter film 2 rapidly decreases resulting in the consumption of the operation time.

Needless to say, the high filtration speed of the filter of the type as described above should be maintained for a long period of operation time when the filter is adapted to the swing rotor type of centrifugal separator as well as the angle rotor type of centrifugal separator.

SUMMARY OF THE INVENTION

Accordingly, the essential object of the present invention is to provide a filter for a centrifugal separator wherein, in either case when the filter is used with the angle rotor type and swing rotor type of centrifugal separators, the filter film will not easily clog with residue so that a high filtration speed of the filter is maintained for a long period of operation time.

Another important object of the present invention is provide a filter of the above type wherein the necessary and minimum residue, solute or liquid including residue is ensured to be caught in the sample chamber even if the centrifugal separator is operated for too long a period of time.

In accomplishing these and other objects, according to the present invention, there is provided a filter for a centrifugal separator which comprises a cylindrical body; a partition wall which is arranged in said cylindrical body so as to define a sample chamber and a filtrate chamber at both sides thereof, and has an aperture passing therethrough to place said sample chamber in communication with said filtrate chamber; and a filter film mounted on said partition wall so as to cover said aperture. Said partition wall is designed such that said filter film is inclined at a predetermined angle $\theta3$ with respect to an axis of said cylindrical body, provided that $0° \leq \theta3 < 90°$.

With the filter as described above, in either case when the filter is used with the different type of centrifugal separators, i.e. the angle rotor type of centrifugal separator and the swing rotor type of centrifugal separator, the filter is inclined or perpendicular to the axis of the rotor during the operation of the centrifugal separators, when the filter is set on the rotor in the appropriate direction. That is to say, the filter film never becomes parallel to the axis of the rotor. Accordingly, the residue contained in the liquid sample gradationally moves, in the sample chamber, in the same direction as that of the centrifugal force so as to slide on the filter film so that a part of the filter film is free from being covered with the residue and always permits the solvent to rapidly pass therethrough from the sample chamber into the filtrate chamber.

BRIEF DESCRIPTION OF THE DRAWINGS

These and other objects and features of the present invention will become apparent from the following description taken in conjunction with the preferred embodiments thereof, with reference to the accompanying drawings, in which.

DETAILED DESCRIPTION OF THE PREFERRED EMBODIMENT

Before the description of the present invention proceeds, it is to be noted that like parts are designated by like reference numerals and symbols throughout the accompanying drawings.

Referring, first, to FIGS. 4 to 6a which show a filter according to the first embodiment of the present invention, the filter F comprises three parts, i.e. a sample container 11 in which the liquid sample is to be supplied, a cap 16 plugged into the upper opening of the sample container 11, and a filtrate container 13 which is coupled to the bottom end portion of the sample container 11 for the purpose of reserving the filtrate having moved from the sample container 11.

Figures 4, 5, 6A, 6B:
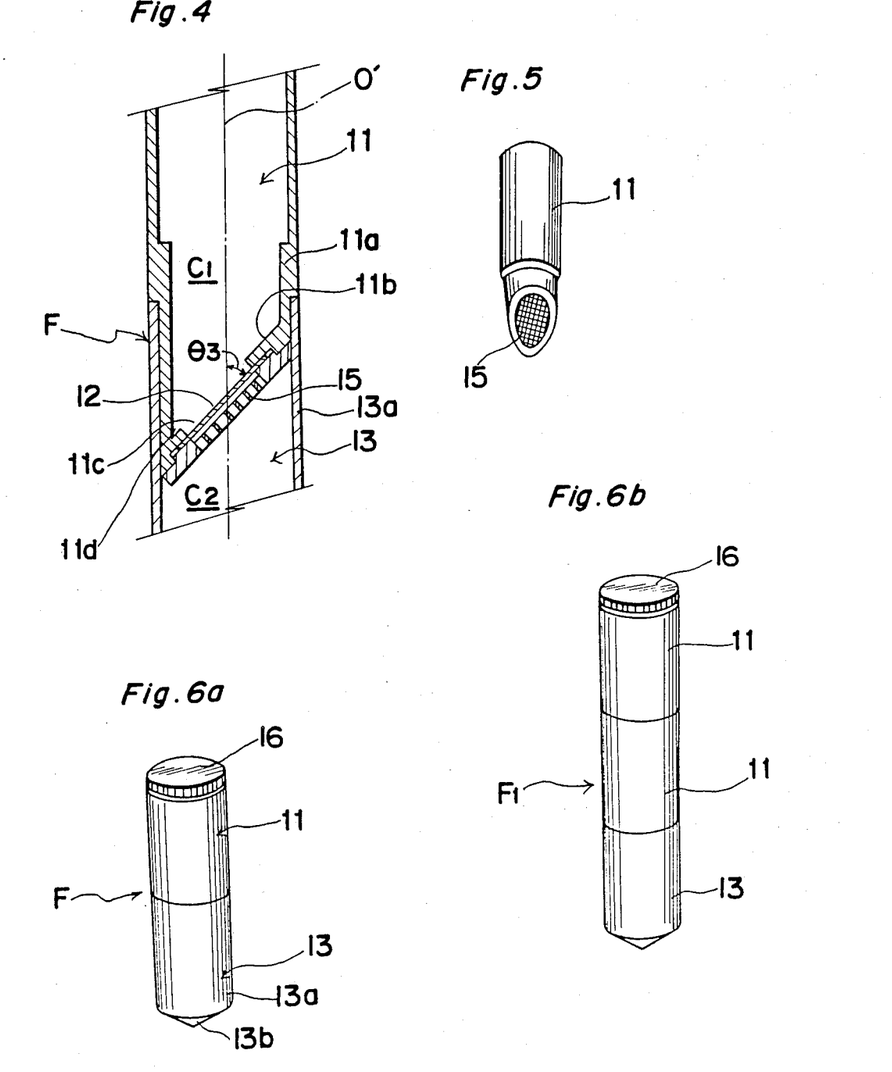
FIG. 4 is an enlarged partial sectional view of a filter according to one preferred embodiment of the present invention.
FIG. 5 is a perspective view of a sample container of the filter shown in FIG. 4.
FIG. 6a is a perspective view of the entire filter shown in FIG. 4.
FIG. 6b is a perspective view showing a modification of the filter according to the present invention.

The sample container 11 comprises a cylindrical body 11a, a bottom wall 11b secured to the bottom portion of the body 11a, a filter film 12 secured to the bottom wall 11b, and a filter holder 15 for holding the filter film 12 to the bottom wall 11b. The sample chamber defined in the container 11 to reserve the supplied liquid sample is indicated "C1".

The filtrate container 13 comprises a cylindrical body 13a with a bottom wall 13b. The filtrate container 13 is designed so as to fit over the bottom portion of the sample container 11. The filtrate chamber defined in the container 13 to reserve the filtrate is indicated by "C2". As shown best in FIG. 4, the bottom wall 11b serves as a partition wall defining, at both sides thereof, a sample chamber C1 and filtrate chamber C2.

The bottom wall 11b is designed so as to be inclined to the axis O' of the filter F at a predetermined angle $\theta 3$. Accordingly, the filter film 12 is also inclined to the axis O' at the inclination angle $\theta 3$. The bottom wall 11b has, at its central portion, an aperture 11c for placing both chambers C1 and C2 in communication with each other. A residue reserving space 11d is defined, at the tip portion of the sample container 11, between the inner surface of the body 11a and the inner surface of the bottom wall 11b.

The filter film 12 is applied to the outer face of the bottom wall 11b to cover the aperture 11c and is held between the bottom wall 11b and the filter holder 15. The filter holder 15 is a mesh-type so as to easily permit the solvent contained in the liquid sample to pass therethrough.

Figure 7:
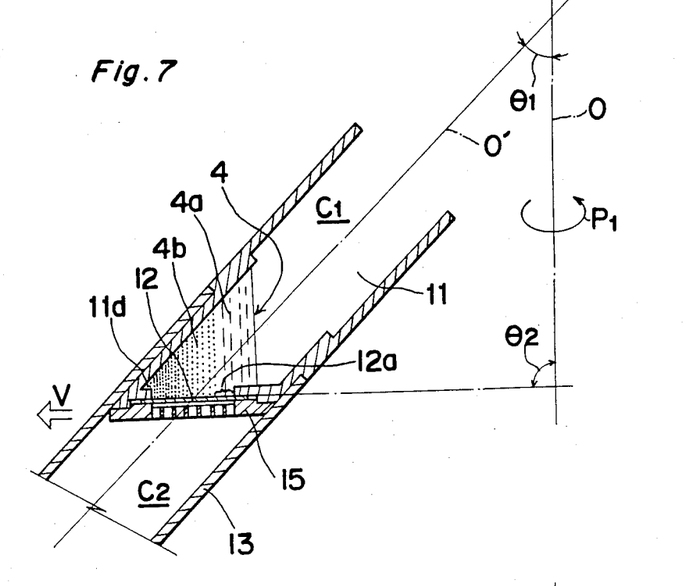
FIGS. 7 and 8 are enlarged partial sectional views respectively showing the filter shown in FIGS. 4 and 6a utilized with the angle rotor type and swing rotor type of centrifugal separators.

The inclination angle $\theta 3$ should preferably be as small as possible for a reason which will be described hereafter. However, if the inclination angle $\theta 3$ is too small, it becomes difficult to precisely form the portion of the residue reserving space 11d. Accordingly, the inclination angle $\theta 3$ should be determined at an appropriate degree. The most preferably angle $\theta 3$ is approximately "$90° - \theta 1$". The inclination angle $\theta 1$, shown in FIG. 7, is the filter fixing angle, i.e. an angle formed between the rotational axis O of the rotor of the angle rotor type of centrifugal separator and the axis O' of the filter F fixed in the corresponding bore formed in the rotor. In this embodiment, the inclination angle $\theta 3$ is determined at the degree "$90° - \theta 1$". More specifically, since the filter fixing angle $\theta 1$ is generally determined to be approximately 30° to 60°, the inclination angle $\theta 3$ is 30° to 60°.

As shown in FIG. 7, when the filter F, as described above, is utilized for the angle rotor type of centrifugal separator, the filter F is fixed into a corresponding bore formed in the rotor so that the filter film 12 is positioned so as to be perpendicular to the axis O of the rotor. Accordingly, when the operation of the centrifugal separation is conducted, the residue 4b contained in the liquid sample 4 gradationally moves in the same direction V as that of the centrifugal force and slides on the upper face of the filter film 12. Therefore, the filter film 12 is hardly subject to the centrifugal force but is subject to only the static pressure generated by the liquid sample 4. Accordingly, the part 12a of the filter film 12 nearest the axis O is free from being covered by the residue 4b for a long period of operation time and, hence, will not easily clogg with residue 4b, so that the high filtration speed is ensured for a long period of time.

Figure 8:
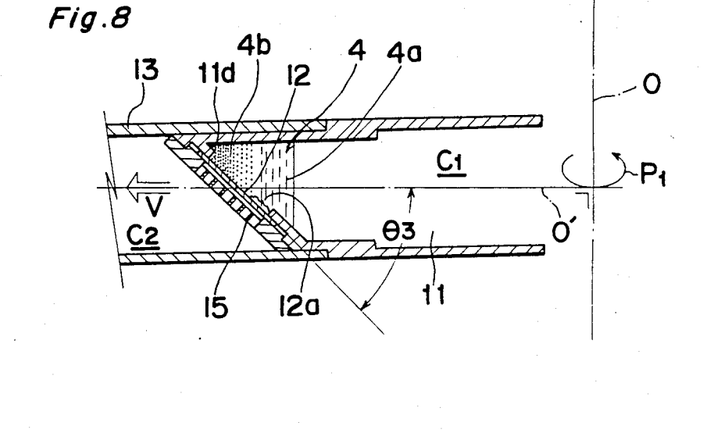

When the filter F is utilized with the swing rotor type of centrifugal separator, the filter F is suspended from the rotor so that the residue reserving space 11d is oriented radially outwardly with respect to the rotational axis O of the rotor. The filter F becomes, during the operation, horizontal or perpendicular to the axis O of the rotor, so that the filter 12 assumes a position in which the filter film 12 is at an angle $\theta 3$ with respect to the direction V of the centrifugal force. In this case, the filter film 12 receives a component of the centrifugal force. However, the residue 4b can slide on the filter film in the direction V of the centrifugal force. This is substantially the same situation as the prior art case shown in FIG. 2. Accordingly, it will be readily understood that according to this filter F, the solvent 4a contained in the liquid sample 4 at the sample chamber C1 can easily pass through the filter film 12 into the filtrate chamber C2.

In either case when the filter F is utilzed with both types of centrifugal separators shown in FIGS. 7 and 8, the residue 4b moves into the residue reserving space 11d and is caught by the space 11d. That is to say, even if the operation time exceeds the predetermined appropriate value, the residue 4b caught in the space 11d never moves to the filtrate chamber C2. Accordingly, the gathering of the necessary and minimum amount of residue is ensured in this filter F.

When the liquid sample 4 is desired to be classified according to the diameter of the residue or solute, such an assembly F1 of filter as shown in FIG. 6b is advantageously used. The assembly F1 comprises a pair of sample containers 11 coupled to each other, one filtrate container 13 coupled to the bottom portion of the lower sample container 11, and a cap 16 for plugging the opening of the upper sample container 11. The upper and lower sample containers 11 and 11 respectively have different filters. Namely, the upper container has a coarse filter, while the lower container has a fine filter. Therefore, the residue having a relatively large diameter remains in the upper container, while the residue having a relatively small diameter remains in the lower container.

Figure 9:
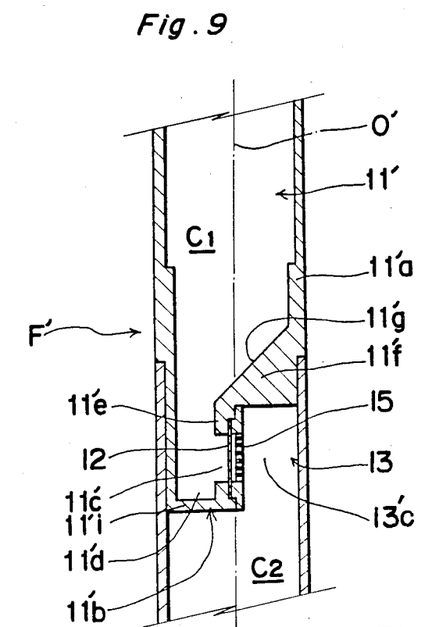
FIG. 9 is an enlarged partial sectional view of a filter according to another embodiment of the present invention.
Figure 10:
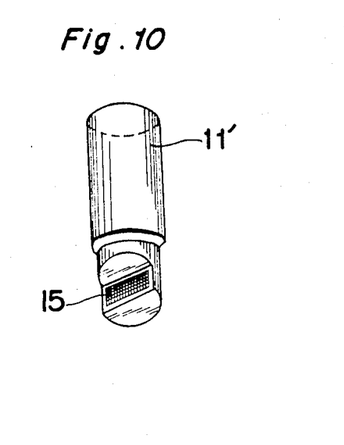
FIG. 10 is a perspective view of a sample container of the filter shown in FIG. 9.
Figure 11:
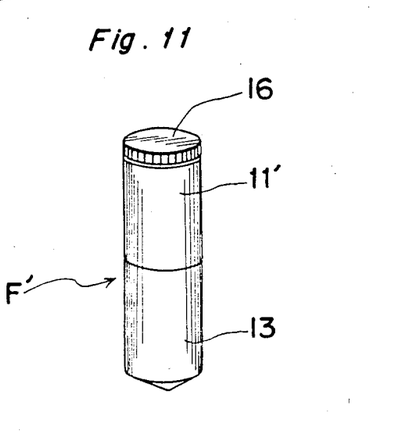
FIG. 11 is a perspective view of the entire filter shown in FIG. 9.

Referring to FIGS. 9 to 11, which show a filter according to a second embodiment of the present invention, the filter F' also has a sample container 11', a filtrate container 13 and a cap 16. The cap 16 and filtrate container 13 are respectively the same as those of the first embodiment on one hand, and the sample container 11' is slightly different from that of the first embodiment. The sample container 11' includes a cylindrical body 11'a a bottom wall 11'b secured to the bottom portion of the body 11'a, a filter film 12 mounted on the bottom wall 11'b, and a filter holder 15 for securing the filter film 12 to the bottom wall 11'b.

The bottom wall 11'b serves as a partition wall for defining, at both sides thereof, the sample chamber C1 and the filtrate chamber C2 when the both containers 11' and 13 are assembled to each other. The bottom wall 11'b has a stepped configuration comprising a filtrating portion 11'e substantially parallel to the axis O' of the filter F', a bottom portion 11'i for connecting the lower end portion of the filtrating portion 11'e to the bottom portion of the body 11'a, and a connecting portion 11'f for connecting the upper end portion of the filtrating portion 11'e to the different bottom portion of the body 11'a. The filtrating portion 11'e has an aperture 11'c passing therethrough. The filter film 12 is applied on the outer face of the filtrating portion 11'e and is held between said portion 11'e and the filter holder 15. Since the filtrating portion 11'e is parallel to the axis O', the filter film 12 mounted on said portion 11'e is also parallel to the axis O'. As apparent from FIG. 9, the filtrating portion 11'e is positioned adjacent to the axis O'. Therefore, an inlet space 13'c is defined between the filtrating portion 11'e and the body of the filtrate container 13. The liquid sample to be supplied into the sample chamber C1 can move to the filtrate chamber C2 through the filter film 12 and the inlet space 13'c. The inner face 11'g is inclined with respect to the body 11'. A residue reserving space 11'd is defined between the filtrating portion 11'e and bottom portion 11'i of the bottom wall 11'b and the bottom portion of the body 11'a.

Figure 12:
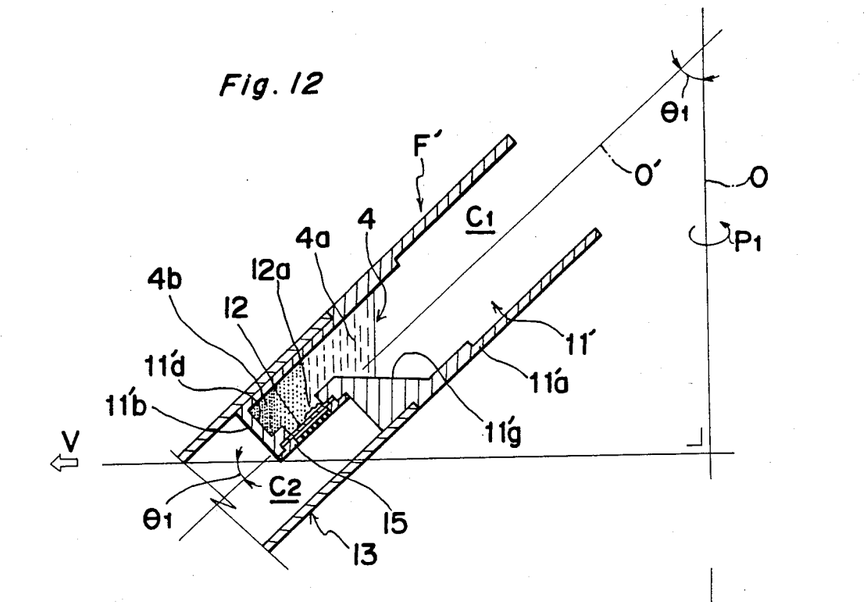
FIGS. 12 and 13 are enlarged partial sectional views showing the filter shown in FIG. 9 utilized with the angle rotor type and swing rotor type of centrifugal separators.

FIG. 12 shows the filter F' utilized with an angle rotor type of centrifugal separator. As previously described, since the filter film 12 is so positioned so as to be substantially parallel to the axis O' of the filter F', when the filter F' is fixed into the corresponding bore formed in the rotor such that the residue reserving space 11'd is positioned radially outwardly with respect to the axis O of the rotor, the filter film 12 is inclined with respect to the direction V of the centrifugal force at an angle $90° - \theta 1$. Accordingly, when the operation of the centrifugal separator is conducted, the residue 4b contained in the liquid sample 4 moves in the direction V of the centrifugal force, that is to say, leaves the filter film 12. Therefore, the filter film 12 receives only a static pressure imparted by the liquid sample 4 does not at directly receive the centrifugal force. Thus, the filter film 12 will not easily clog with the residue 4b. In addition, since the residue gradationally covers the filter film 12 from the part adjacent to the residue reserving space 11'd to the part remote from said space 11'd, the entire part of the filter film 12 is not covered by the residue 4b and the upper part 12a from the residue reserving space 11'e is always free from the the residue so that the solvent 4a in the liquid sample 4 can easily and rapidly pass through the filter film 12 into the filtrate chamber C2.

Figure 13:
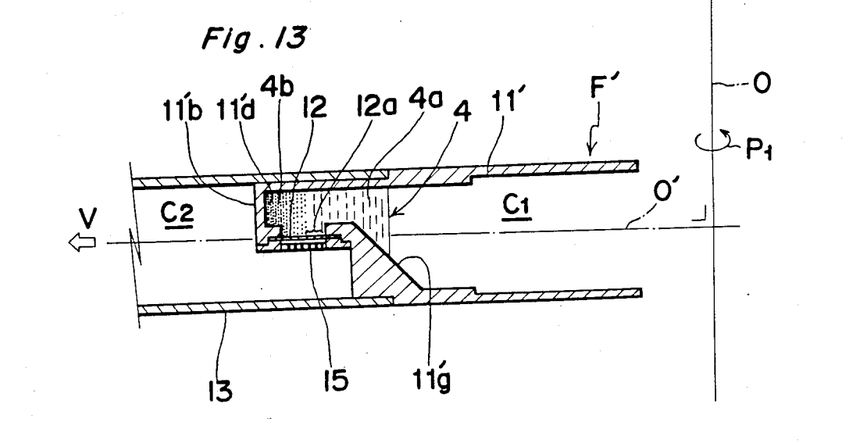
Figure 14:
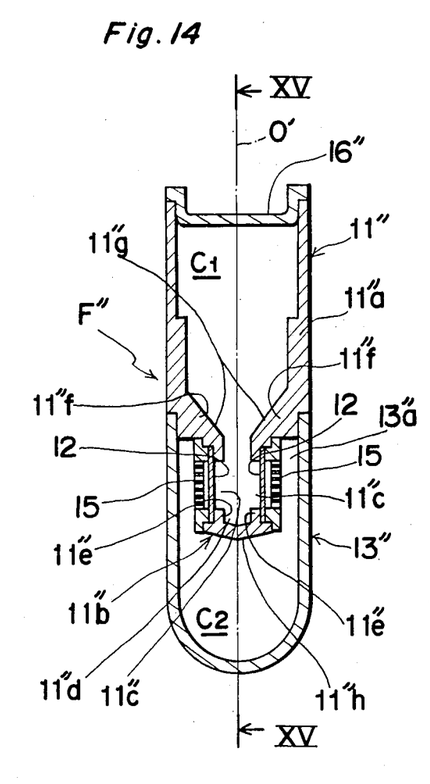
FIG. 14 is an enlarged sectional view of a filter according to a further embodiment of the present invention.
Figure 15:
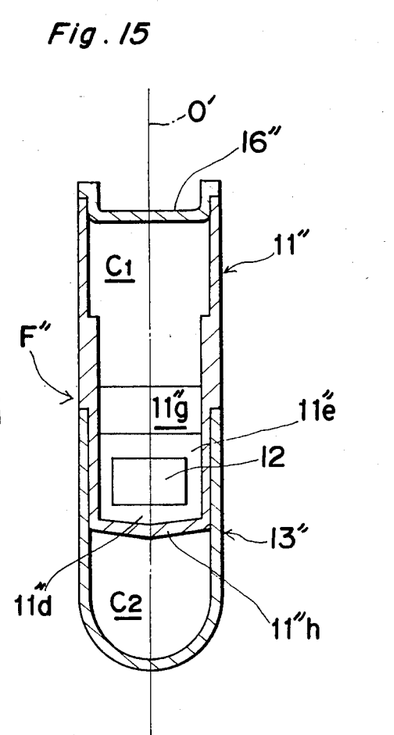
FIG. 15 is an enlarged sectional view taken along line XV—XV of FIG. 14, FIGS. 16 and 17 are enlarged sectional views respectively showing the filter of FIG. 14 utilized with the angle rotor type and swing rotor type of centrifugal separators.

When the filter F' is utilized with the swing rotor type of centrifugal separator, the filter F' is horizontal during the operation so that the filter film 12 is positioned so as to be perpendicular to the axis O of the rotor and, hence, parallel to the direction V of the centrifugal force. Accordingly, the solvent 4a can easily and rapidly pass through a part 12a of the filter film 12 in a manner similar to the case of FIG. 7.

In either case when the filter F' is utilized with both types of centrifugal separators, the residue reserving space can catch at least a minimum amount of residue.

Referring to FIGS. 14 to 18, which show a third embodiment of the present invention, the filter F'', i.e. a modification of the filter F' according to the second embodiment, has a pair of filter films 12 on the bottom wall 11''b of the sample container 11''. With this filter F'', the ratio of the filtrating area to the volume of the sample container 11'' can be made larger than those of the first and second embodiments so that the filtration speed is relatively high. The bottom wall 11''b as the partition wall is of a symmetrical configuration comprising a pair of filtrating portions facing each other and substantially parallel to the axis O' of the filter F'', an intermediate portion 11''h extending between the lower edges of the filtrating portions 11''e to form a residue reserving space 11''d, and a pair of connecting portions for connecting the filtrating portions 11''e to the bottom portion of the body 11''a.

Figure 16:
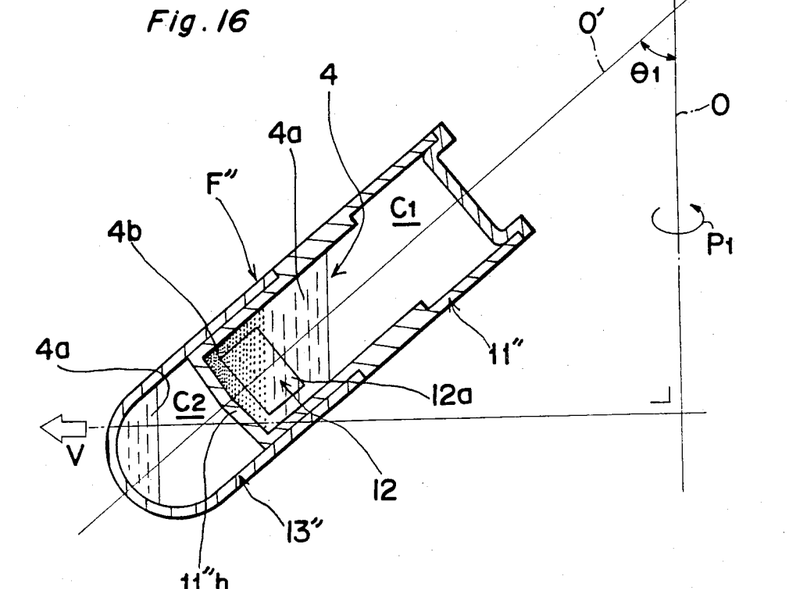
Figure 17:
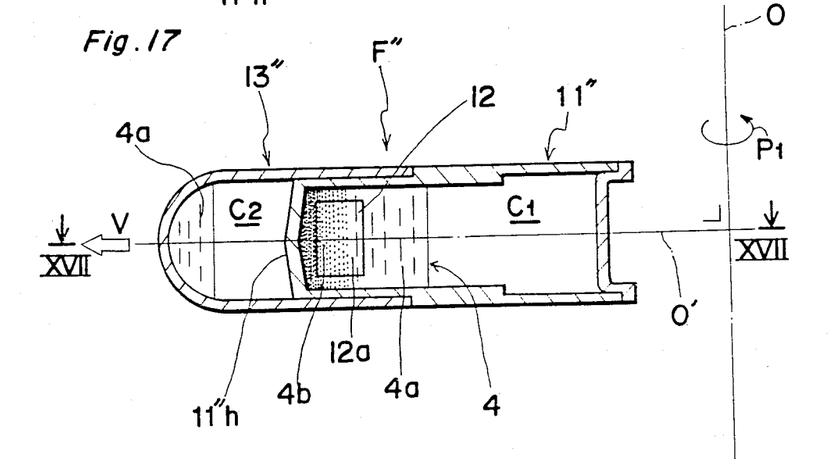
Figure 18:
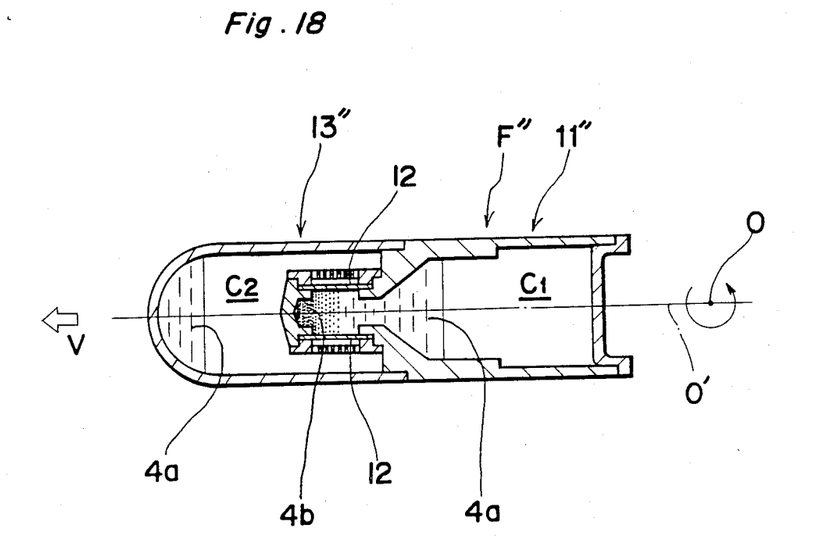
FIG. 18 is a sectional view taken along line XVII—XVII of FIG. 17.

FIGS. 16 and 17 respectively show the filter F'' utilized with the angle rotor type and swing rotor type centrifugal separators. In either case, the filter F'' is preferably so fixed in the corresponding bore formed in the rotor so that the pair of filter films 12 are, respectively, included the vertical planes, as shown in FIG. 18. In either case, the filter films 12 one hardly subject to the centrifugal force during the operation, because the filter films 12 are positioned parallel to the direction V of the centrifugal force. Therefore, the solvent 4a contained in the liquid sample 4 can easily and rapidly pass through the filter film 12 from the sample chamber C1 into the filtrate chamber C2. The solvent 4a and, hence, filtrate 4a, having passed the filter film 12 is reserved in the filtrate chamber C2 of the filtrate container 13". The minimum amount of residue 4b is caught in the residue reserving space 11"d.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A filter providing a high filtration rate when used with swing rotor type and angle rotor type centrifugal separators for filtering a sample, said filter comprising:
   means for adapting said filter to be used with the swing rotor type centrifugal separator with a filter film thereof disposed at a predetermined angle relative to the horizontal, the sample in a sample chamber of the filter being forced in a horizontal direction against said filter film disposed at said predetermined angle where it is filtered with residue of the sample that is unable to pass through said filter film remaining in said sample chamber against only a portion of said filter film and filtrate passing through the remainder of said filter film into a filtrate chamber of the filter when used therewith
   and for adapting said filter to be used with the angle rotor type centrifugal separator, the residue unable to pass through said filter film remaining in said sample chamber against only a portion of said filter film and the filtrate passing through the remainder of said filter film into the filtrate chamber of the filter when used therewith,
   said means for adapting said filter to be used with the swing rotor type centrifugal separator and for adapting said filter to be used with the angle rotor type centrifugal separator including
   a cylindrical body having first and second ends,
   a partition wall fixed to the inner periphery of said cylindrical body between said first and said second ends for separating said cylindrical body into the sample chamber defined between said partition wall and said first end and in which the sample is received prior to filtering and the filtrate chamber defined between said partition wall and said second end, said partition wall having an aperture extending therethrough for placing said sample chamber and said filtrate chamber in communication with each other, and
   the filter film for filtering the sample attached to said partition wall over said aperture so as to be fixed with said partition wall to said cylindrical body between said sample chamber and said filtrate chamber,
   said filter film disposed relative to the central longitudinal axis of the cylindrical body at a predetermined angle of at least 0° and less than 90°.

2. A filter as claimed in claim 1,
wherein said cylindrical body is a first cylindrical sample container detachably coupled at one end thereof to a cylindrical filtrate container, and said partition wall is a bottom wall of said first cylindrical sample container.

3. A filter as claimed in claim 1,
wherein said cylindrical body is a first cylindrical sample container detachably coupled at one end thereof to a cylindrical filtrate container, and said partition wall is a bottom wall of said first cylindrical sample container; and
said filter further comprises at least one other sample container having a bottom wall and coupled in series to said first sample container, and a respective filter film attached to the bottom wall of each of said at least one other sample containers.

4. A filter as claimed in claim 1,
wherein said predetermined angle is between 30° and 60°.

5. A filter providing a high filtration rate when used with swing rotor type and angle rotor type centrifugal separators for filtering a sample, said filter comprising:
   means for adapting said filter to be used with the swing rotor type centrifugal separator with a filter film thereof disposed at a predetermined angle relative to the horizontal, the sample in a sample chamber of the filter being forced in a horizontal direction against said filter film disposed at said predetermined angle where it is filtered with residue of the sample that is unable to pass through said filter film remaining in said sample chamber in a residue reserving space defined therein and filtrate passing through said filter film into a filtrate chamber of the filter when used therewith
   and for adapting said filter to be used with the angle rotor type centrifugal separator, the residue unable to pass through said filter film remaining in said sample chamber and the filtrate passing through said filter film into the filtrate chamber of the filter when used therewith,
   said means for adapting said filter to be used with the swing rotor type centrifugal separator and for adapting said filter to be used with the angle rotor type centrifugal separator including
   a cylindrical body having first and second ends,
   a partition wall fixed to the inner periphery of said cylindrical body between said first and second ends for separating said cylindrical body into the sample chamber defined between said partition wall and said first end and in which the sample is received prior to filtering and the filtrate chamber defined between said partition wall and said second end, said partition wall extending toward the longitudinal central axis of said cylindrical body for defining the residue reserving space in said sample chamber adjacent a portion of said partition wall, said partition wall having an aperture extending therethrough for placing said sample chamber and said filtrate chamber in communication with each other, and
   the filter film for filtering the sample attached to said partition wall over said aperture so as to be fixed with said partition wall to said cylindrical body,
   said filter film being disposed relative to the central longitudinal axis of the cylindrical body at a predetermined angle of at least 0° and less than 90°.

6. A filter providing a high filtration rate when used with swing rotor type and angle rotor type centrifugal separators for filtering a sample, said filter comprising:

means for adapting said filter to be used with the swing rotor type centrifugal separator with a filter film thereof disposed parallel to the horizontal, the sample in a sample chamber of the filter being forced in a horizontal direction against a portion of a partition wall which directs the sample towards said filter film parallel to the horizontal where it is filtered with residue of the sample that is unable to pass through said filter film remaining in a residue reserving space defined in said sample chamber and filtrate passing through said filter film into a filtrate chamber of the filter when used therewith and for adapting said filter to be used with the angle rotor type centrifugal separator, the residue unable to pass through said filter film remaining in said sample chamber and the filtrate passing through said filter film into the filtrate chamber of the filter when used therewith, said means for adapting said filter to be used with the swing rotor type centrifugal separator and for adapting said filter to be used with the angle rotor type centrifugal separator including a cylindrical body having first and second ends, a partition wall fixed to the inner periphery of said cylindrical body between said first and second ends for separating said cylindrical body into the sample chamber defined between said partition wall and said first end and in which the sample is received prior to filtration and the filtrate chamber defined between said partition wall and said second end, said partition wall extending toward the central longitudinal axis of said cylindrical body for defining the residue reserving space in said sample chamber adjacent a portion of said partition wall, said partition wall having an aperture extending therethrough for placing said sample chambers and said filtrate chamber in communication with each other, and the filter film for filtering the sample attached to said partition wall over said aperture so as to be fixed with said partition wall to said cylindrical body, said filter film being disposed parallel to the central longitudinal axis of the cylindrical body.

7. A filter providing a high filtration rate when used with swing rotor type and angle rotor type centrifugal separators for filtering a sample, said filter comprising:

means for adapting said filter to be used with the swing rotor type centrifugal separator with filter films thereof disposed parallel the horizontal, the sample in a sample chamber of the filter being forced in a horizontal direction against an extending portion of a partition wall of the filter where it is filtered with residue of the sample that is unable to pass through said filter film remaining in a residue reserving space defined in said sample chamber and filtrate is directed by said extending portion of said partition wall to pass through said filter films into a filtrate chamber of the filter when used therewith and for adapting said filter to be used with the angle rotor type centrifugal separator, the residue unable to pass through said filter films remaining in said sample chamber and filtrate passing through the filter films into the filtrate chamber of the filter when used therewith, said means for adapting said filter to be used with the swing rotor type centrifugal separator and for adapting said filter to be used with the angle rotor type centrifugal separator including a cylindrical body having first and second ends, the partition wall fixed to the inner periphery of said cylindrical body between said first and second ends for separating said cylindrical body into the sample chamber defined between said partition wall and said first end and in which the sample is received prior to filtering and the filtrate chamber defined between said partition wall and said second end, said partition wall having a pair of filtrating portions spaced from and extending parallel to each other, said filtrating portions extending substantially parallel to the central longitudinal axis of said cylindrical body, each of said pair of filtrating portions having an aperture extending therethrough for placing said sample chamber and said filtrate chamber in communication with each other, said partition wall having the extending portion extending between said filtrating portions and at which the residue reserving space is defined, and the filter films comprising a pair of filter films for filtering the sample, each of said pair of filter films respectively attached to one of said filtrating portions of said partition wall over a respective said aperture so as to be fixed with said partition wall to said cylindrical body, each of said filter films being disposed parallel to the central longitudinal axis of the cylindrical body.

* * * * *